(12) United States Patent
Fini et al.

(10) Patent No.: US 9,158,066 B2
(45) Date of Patent: Oct. 13, 2015

(54) BEND COMPENSATED FILTER FIBER

(71) Applicant: OFS Fitel, LLC, Norcross, GA (US)

(72) Inventors: John M Fini, Metuchen, NJ (US);
James W Fleming, Westfield, NJ (US);
Jeffrey W Nicholson, Warren, NJ (US);
Thierry F Taunay, Bridgewater, NJ (US); Man Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/361,155

(22) PCT Filed: Dec. 14, 2012

(86) PCT No.: PCT/US2012/069814
§ 371 (c)(1),
(2) Date: May 28, 2014

(87) PCT Pub. No.: WO2013/090759
PCT Pub. Date: Jun. 20, 2013

(65) Prior Publication Data
US 2014/0334788 A1     Nov. 13, 2014

Related U.S. Application Data

(60) Provisional application No. 61/570,403, filed on Dec. 14, 2011, provisional application No. 61/570,389, filed on Dec. 14, 2011.

(51) Int. Cl.
*G02B 6/02* (2006.01)
*G02B 6/028* (2006.01)
*G02B 6/036* (2006.01)
*G02B 6/12* (2006.01)

(52) U.S. Cl.
CPC .............. *G02B 6/028* (2013.01); *G02B 6/0283* (2013.01); *G02B 6/0286* (2013.01); *G02B 6/0365* (2013.01); *G02B 6/03627* (2013.01); *G02B 6/03655* (2013.01); *G02B 2006/12166* (2013.01)

(58) Field of Classification Search
None
See application file for complete search history.

(56) References Cited

U.S. PATENT DOCUMENTS

2011/0044596 A1*   2/2011   Zhang et al. .................. 385/124

* cited by examiner

Primary Examiner — Ryan Lepisto
Assistant Examiner — Erin Chiem
(74) Attorney, Agent, or Firm — Mandelbaum Salsburg

(57) ABSTRACT

An optical fiber includes a core region having a longitudinal axis. A cladding region surrounds the core region. The core region and cladding region are configured to support and guide the propagation of signal light in a fundamental transverse mode in the core region in the directions of the axis. The fiber has a bend-induced gradient of its equivalent index of refraction indicative of a loss in guidance of the mode. At least a portion of cladding region has a graded index of refraction opposite the bend-induced gradient. The cladding region is configured to have a substantially flat equivalent index in response to a bend of the optical fiber.

20 Claims, 11 Drawing Sheets

FIG. 1
(prior art)
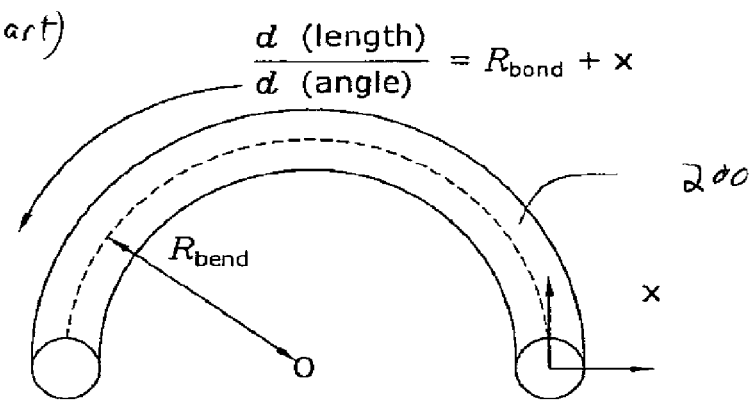
FIG. 3
(prior art)
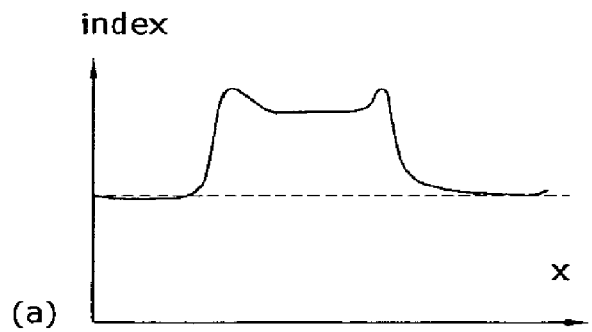
(a)
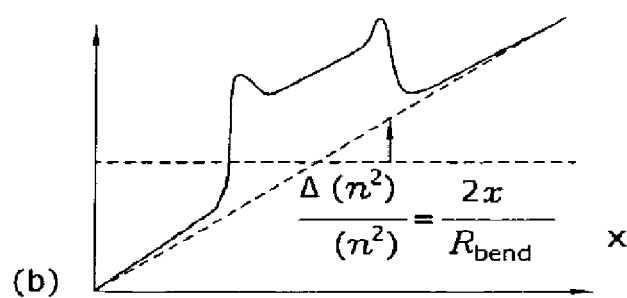
(b)

Straight fiber 801

Bent fiber 801'

BEND COMPENSATED FILTER FIBER

CROSS-REFERENCE TO RELATED APPLICATIONS

This application claims the benefit of U.S. provisional patent application No. 61/570,389 filed Dec. 14, 2011 and U.S. provisional patent application No. 61/570,403 filed Dec. 14, 2011, the disclosures of which are incorporated herein by reference in their entirety.

BACKGROUND OF THE INVENTION

1. Field of the Invention

The invention relates generally to optical fibers. More specifically, the invention relates to a large mode area fiber employed as an optical filter and exhibiting a refractive index profile that minimizes bend-induced limitations on the fiber's filtering properties.

2. Discussion of the Related Art

In the field of optical fiber-based technology, there is an increasing interest in the use of large mode area fibers, including fiber-based optical filters, in which it is desirable to filter or suppress certain wavelengths of light. Such large mode area filter fibers are known to overcome various nonlinear impairments. For example, in some fiber amplifiers and lasers, stimulated Raman scattering (SRS) may limit power and efficiency. Suppressing wavelengths associated with SRS has been demonstrated to significantly improve the performance of such amplifiers and lasers. Some amplifiers may also require suppression of amplified spontaneous emission or spurious lasing at one wavelength (e.g. 1060 nm) in order to provide efficient amplification of a wavelength with competing or intrinsically lower gain (e.g. 940 nm). Similarly, significant benefits of wavelength filtering have been demonstrated in applications such as telecommunications, sensing, etc.

In large mode area filter fibers, there is typically a tradeoff between degree of filtering, effective area, and bend loss, e.g., a required degree of filtering becomes more difficult to achieve as mode area increases. Other properties (beam quality, pump absorption, birefringence, etc.) may also play an important role in overall performance, and limit the degree of filtering.

Bend perturbations play an important role in determining both the bend loss and the degree of filtering. For bend radii typically required for reasonable handling and packaging of conventional filter fibers in operation, the bend perturbation significantly degrades achievable performance.

When conventional filter fibers are employed in high power amplifiers and lasers, for example, overall system performance (output power, pulse energy, etc.) is limited by a failure to attain large effective area, low bend loss, and strong filtering when the filter fiber is arranged in a practical coil size.

At least two different approaches have been employed to minimize bend-induced losses in optical filter fibers. In one approach, a composite filter fiber is kept substantially straight by means of the incorporation of rod-like fibers that are extremely bend resistant. By forcing the filter fiber to remain essentially linear, bend-induced loss can be significantly reduced. This approach may be impractical for many applications, especially when fiber lengths are on the order of one meter or more. That is, this approach may achieve large area, low loss, and strong filtering, but fail to meet constraints on fiber arrangement needed for some applications.

A second approach is associated with predetermining a fixed bend loss by defining a specific "coiling" to be used (consistent with packaging and other practical constraints on fiber arrangement), and then utilizing the filter fiber in accordance with the specified coiling radius (and number of turns). This approach is subject to bend-induced limitations discussed above, for example the tradeoff between mode area, bend loss, and filtering. Similarly, this approach is considered to limit applications of large area filter fibers, as well as limit modifications in field implementations and variations in the use of filter fibers.

Thus, a need remains in the art for a large mode area filter fiber that simultaneously attains large effective area, low bend loss, and strong filtering when the fiber is arranged in a practical coil size.

BRIEF SUMMARY OF THE INVENTION

The above-described problems are addressed and a technical solution achieved in the art by providing an optical fiber that includes a core region having a longitudinal axis. A cladding region surrounds the core region. The core region and cladding region are configured to support and guide the propagation of signal light in a fundamental transverse mode in the core region in the directions of the axis. The fiber has a bend-induced equivalent index of refraction, this gradient in the cladding region having a strong influence on loss and filtering properties of the mode. At least a portion of cladding region has a graded refractive index opposite that of the bend-induced gradient. The cladding region is configured to have a substantially flat equivalent index in response to a bend of the optical fiber.

In an embodiment, the slope of the graded index of refraction (when the fiber is unbent) may be substantially negative. The graded index of refraction may be linear, that is having a substantially constant slope. In an embodiment, the slope of the graded index of refraction comprises a predetermined number of steps.

In one embodiment, the cladding region comprises an inner cladding region and an outer cladding region and the optical fiber further comprises a trench region formed between the core region and the inner cladding region. The portion of cladding region having a graded index of refraction opposite the bend-induced gradient may extend over at least a portion of the inner cladding region. For a given mode of any fiber, the critical radius for bending is an important metric of filtering properties. By introducing a region having an index slope opposite that of the bend-induced gradient, the proposed strategy allows the critical radius to be determined by design. For example, the portion of cladding having a graded index of refraction opposite the bend-induced gradient can extend to the boundary dividing the inner cladding region and the outer cladding region. In such cases, the critical radius can also extend to this boundary. The optical fiber is configured to guide the fundamental mode with substantially no loss at low wavelengths and to exhibit high loss at large wavelengths.

In one embodiment, the outer cladding region and the trench region may have the same index of refraction. The material index of refraction of the fiber as a function of radial position in a pre-compensated portion of the inner cladding region may equal the mode effective index minus a compensation term.

In another embodiment, the outer cladding region is formed from at least one glass tube or of undoped silica. The at least one glass tube may comprise commercially available tubing, such as Heraeus F300 glass, for example. The trench region may be formed of undoped silica or at least one glass tube.

In one embodiment, the core region may include at least one dopant that increases its index above that of the cladding region. The at least one dopant may be at least one of Ge, Al and P. In another embodiment, the core region may include at least one dopant that decreases the index, which may be F or B. In another embodiment, the core region may include at least one dopant that renders the optical fiber to be gain-producing, which may be a rare earth element or Cr.

A cross-section of the core region may be circular, annular, elliptical, polygonal, or other more complex shapes.

The above-described problems are addressed and a technical solution achieved in the art by providing a method of manufacturing an optical fiber, comprising the steps of forming a core region having a longitudinal axis; and forming a cladding region surrounding the core region, the core region and cladding region configured to support and guide the propagation of signal light in a fundamental transverse mode in the core region in the directions of the axis, the fiber profile having a bend-induced gradient of equivalent index of refraction indicative of a loss in guidance of the mode, at least a portion of the cladding having a graded index of refraction opposite the bend-induced gradient. In one embodiment, the optical fiber may be fabricated using an MVCD deposition method or a stacking method.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 2 illustrates an exemplary section of a conventional large core diameter optical fiber that has been bent to exhibit a defined bend radius;

FIGS. 3A and 3B illustrate the impact of a bend on the refractive index of a conventional non-filtering fiber, with FIG. 3A showing the refractive index profile for a substantially "straight" section of fiber, and FIG. 3B showing the equivalent refractive index profile for a fiber as bent in FIG. 2;

It is to be understood that the attached drawings are for purposes of illustrating the concepts of the invention and may not be to scale.

DETAILED DESCRIPTION OF THE INVENTION

Figure 1:
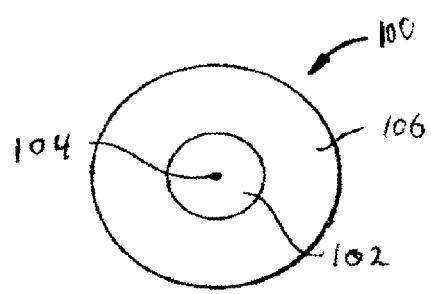
FIG. 1 is a schematic diagram of a graded-index core region of a large mode area filter fiber, according to an embodiment of the present invention.

FIG. 1 is a schematic diagram of a core region of a large mode area filter fiber 100, according to an embodiment of the present invention. The filter fiber 100 may include a core region 102 having a longitudinal axis 104 and a cladding region 106 surrounding the core region. The core region 102 and cladding region 106 may be configured to support and guide the propagation of signal light in the core region 102 in the direction of the axis 104. To this end, the refractive index of the core region 102 ($n_{core} = n_c$) is greater than that of the cladding region 106 ($n_{clad}$). Preferably the core region 102 and the cladding region 106 are configured to propagate signal light preferentially in a fundamental transverse mode at the center wavelength of the signal light.

The term center wavelength of the signal light is intended to recognize the well-known phenomenon of line broadening; that is, no signal source emits light at precisely a single wavelength. Rather, all light sources emit at a center wavelength, where the intensity is typically maximum, as well as at lower intensities in a range of wavelengths extending on both sides of the center wavelength. This range is known as the linewidth. Hereinafter, signal wavelength is understood to refer to signal light that is inherently characterized by a non-zero linewidth.

The filter fiber 100 may be a standard, non-gain producing fiber used in a variety of applications including, for example, transmission systems, access systems, sensor apparatus, motor vehicles, and the like. Alternatively, the filter fiber 100 may be a gain-producing filter fiber, which finds application in, for example, fiber optic amplifiers and fiber optic lasers.

The core region 102 may be a single region, or it may be a composite of two or more different regions. The core region(s) may have a gradient in index of refraction and may have, for example, different dopants, different indices, and/or, in the case of a gain-producing filter fiber, different optical gains. The cladding region 106 may be a composite of two or more different regions. As with the core region, the cladding regions may have, for example, different dopants and/or different indices. Thus, the cladding region 106 may comprise an inner cladding region and one or more outer cladding regions (not shown) disposed radially outside of the inner cladding region. The outer cladding region may include, for example, a down-doped region (or trench), which has an index less than that of the inner cladding region. The index of the inner cladding region ($n_{clad}$) constitutes a frame of reference for the measurement of other index differences; to with, $\Delta n_c = n_{core} - n_{clad}$, which is often referred to as the contrast.

An optical filter fiber 100 may be made of silica and one or more suitable dopants in particular regions. For example, the core region 102 may include one or more dopants that increase its index above that of the cladding region 106, which may comprise substantially pure or undoped silica. Illustrative index-increasing dopants include Ge, Al and P. However, for reasons well known to those skilled in the art, the core region 102 may also include one or more index-decreasing dopants such as F or B. Likewise certain portions of the inner cladding region may include one or more index-decreasing dopants to form trenches. Some regions may include both index-increasing and index-decreasing dopants.

If the filter fiber 100 is a gain-producing fiber, then the core region 102 may include at least one gain-producing dopant (e.g., a rare earth element or Cr). The gain-producing dopant may be distributed throughout the entire core region 102, or it may be confined to only a portion thereof.

Although the use of the term radius in the foregoing discussion implies that the cross-sections of the core regions 102 are circular and/or annular, in practice, the core regions 102 may be non-circular; for example, they may be elliptical, polygonal, or other more complex shapes. Nevertheless, as is common in the art, the term radius may be employed for simplicity and clarity.

FIG. 2 illustrates an exemplary segment of optical fiber 200 that has been bent to exhibit a defined bend radius. As shown, bent fiber 200 is defined as having a bend radius $R_{bend}$, with the x-y orientation as shown. The bending of a fiber, as mentioned above, has been found to introduce changes in mode properties, including loss, filtering and effective area. In particular, the equivalent index model of the bent fiber 200 can be determined and then analyzed to account for the different path lengths "seen" by a propagating optical signal at different transverse positions x as it travels around the bend of radius $R_{bend}$ as follows:

$$\frac{d(\text{length})}{d(\text{angle})} = R_{bend} + x,$$

where path lengths are adjusted by defining the equivalent index profile $n_{eq}^2$, $$n_{eq}^2(x, y) = n^2(x, y)\left(1 + \frac{2x}{R_{bend}}\right),$$

which is considered to be a modified version of the nominal refractive index profile ($n^2$) of the optical fiber material. FIGS. 3A and 3B illustrates the impact of a bend on the refractive index of a conventional non-filtering fiber, with FIG. 3A showing the refractive index profile for a substantially "straight" section of fiber, and FIG. 3B showing the refractive index profile for a fiber as bent in FIG. 2. As shown, the equivalent refractive index is shifted upward along a slope defined by the following relation:

$$\Delta n = \frac{nx}{R_{bend}}.$$

The equivalent index model defined above leads to the conclusion that the effect of a bend in a fiber (particularly a large area fiber) can be likened to adding a constant index gradient to the profile of the fiber material itself (assuming low contrast). Prior art fiber design has concentrated on controlling the filtering properties subject to the limitation that the equivalent index profile has a slope in the cladding equal to the bend-induced gradient [that is, that the cladding has constant material refractive index]. This limitation imposes an important tradeoff between mode area, filter performance and bend loss. In accordance with the present invention, however, we consider designs where the equivalent index profile has a slope much smaller in magnitude than the bend induced gradient. In such cases, the bend induced gradient is at least partially cancelled by a slope in the fabricated index profile. In many high power applications, it is important to prevent detrimental nonlinear effects from occurring in the signal light. To this end, fibers with large mode area (LMA) are often used. A LMA fiber has a relatively large mode-field diameter (MFD) or a relatively large mode-field area ($A_{eff}$). Those skilled in the art recognize that MFD and $A_{eff}$ are equivalent parameters only when the mode field shape is substantially Gaussian. However, when the mode-field shape departs from strictly Gaussian, then the MFD is generally not the best way to describe the size of the guided mode relevant to nonlinearity. In this case, the industry relies instead upon $A_{eff}$, which is given by:

$$A_{eff} = \frac{\left(\int |E|^2 dA\right)^2}{\int |E|^4 dA}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the MFD is an appropriate metric for the diameter of the mode and may be expressed as:

$$MFD = 2\sqrt{\frac{2\int |E|^2 dA^2}{\int \left|\frac{dE}{dr}\right|^2 dA}}$$

where r is the radial coordinate. When the mode-field shape is exactly equal to an axisymmetric Gaussian function, then $A_{eff} = \pi \times MFD^2/4$.

Although LMA fibers advantageously reduce the effects of nonlinearities, they are disadvantageously more sensitive to bend distortion, which reduces the $A_{eff}$ and radially displaces and distorts the optical modes. Mode size can impact other important system aspects, such as splice loss.

Figures 4A, 4B:
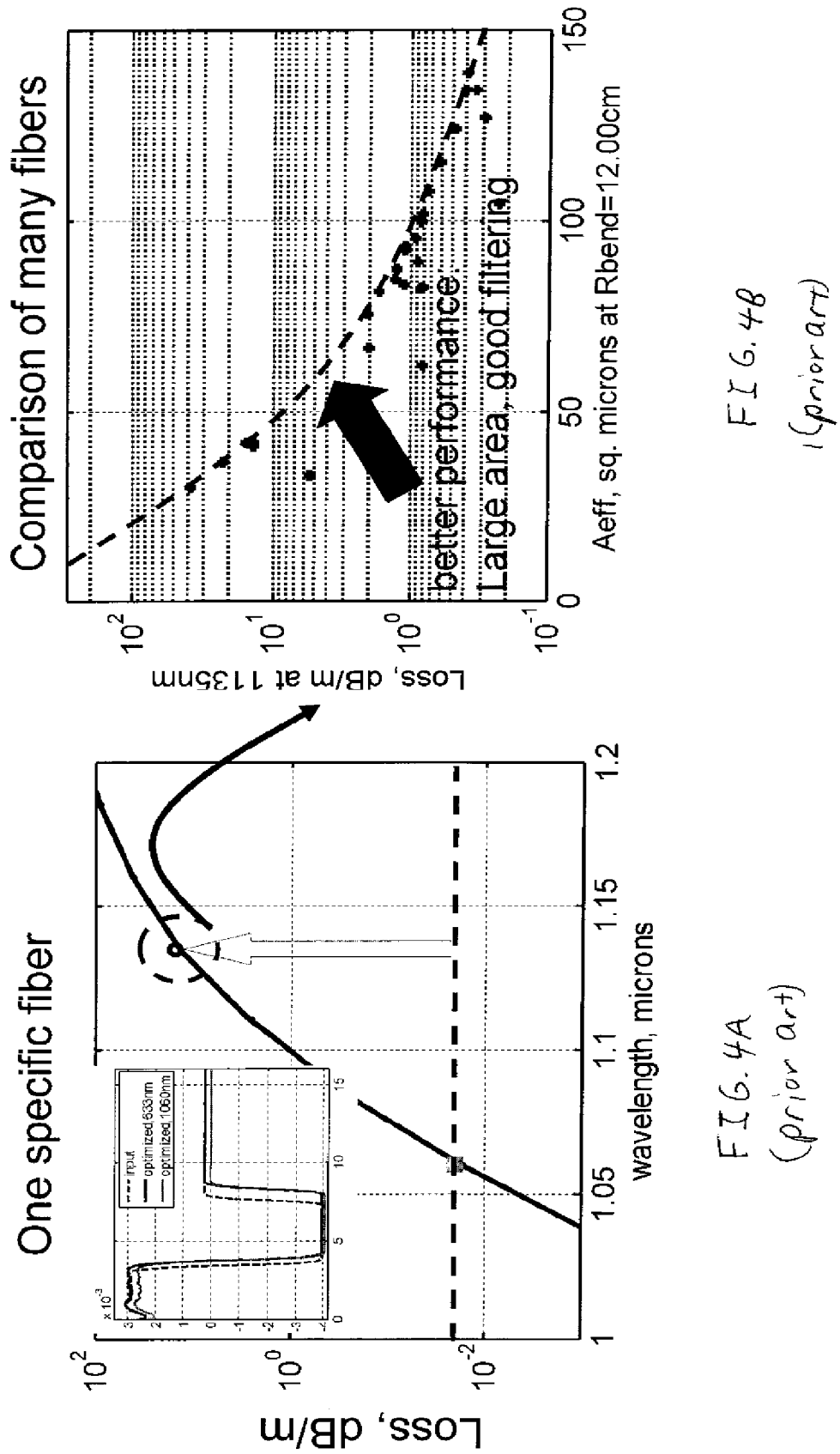
FIG. 4A graphically illustrates filtering loss versus wavelength for a single conventional filter fiber having an index profile.
FIG. 4B is a plot of filtering loss versus effective area $A_{eff}$ of several conventional bent filter fibers, each having a bend radius of about 12 cm.

With conventional filter fibers, there is an inherent tradeoff between mode area and filter selectivity or sharpness. FIG. 4A graphically illustrates filtering loss versus wavelength for a single conventional filter fiber having an index profile shown in the inset (to be described in more detail below). FIG. 4B is a plot of filtering loss versus effective area $A_{eff}$ of several conventional bent filter fibers, each having a bend radius of about 12 cm. As shown in FIGS. 4A and 4B, there is a limit (as represented by the black dashed line) of how much filtering (or noise wavelength suppression) may be achieved. This limit decreases with effective area.

Figure 5A:
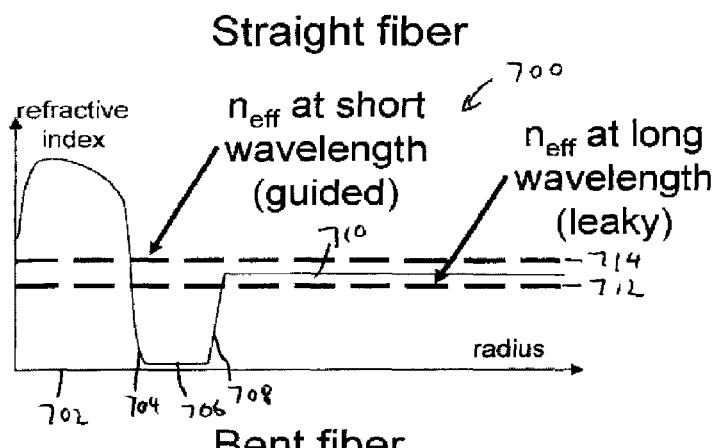
FIG. 5A is a refractive index profile of a conventional straight filter fiber.
Figure 5B:
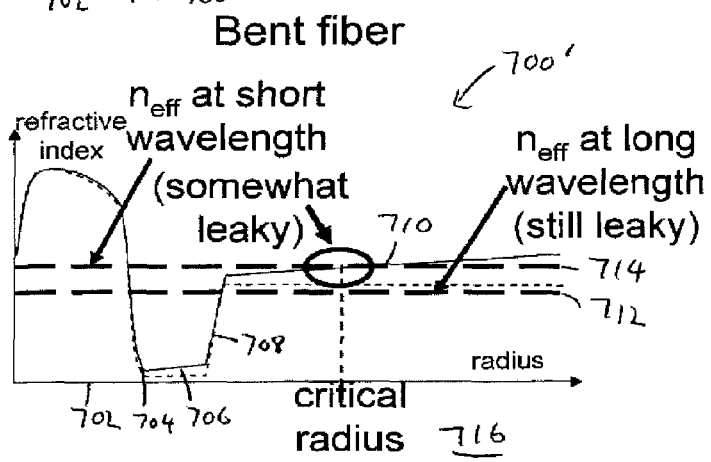
FIG. 5B is an equivalent refractive index profile of a conventional filter fiber when the filter fiber is bent.

FIG. 5A is a refractive index profile 700 of a conventional straight filter fiber. FIG. 5B is a refractive index profile 700' of a conventional filter fiber when the filter fiber is bent. In the straight fiber profile of FIG. 5A, the profile 700 typically exhibits a high index of refraction in a core region 702 near the fiber center, with a rapidly decreasing index in a region 704 that settles in a substantially low index of refraction region known as a trench 706, followed by a rapidly increasing index in the region 708 that plateaus in a cladding region 710.

Ideally, with no purturbations, the conventional filter fiber of FIG. 5A is configured to rigorously guide a mode of a low wavelength of signal light with no loss, as illustrated by the dashed line 714 (i.e., depicting effective index of refraction $n_{eff}$ at short wavelengths). At the same time, as illustrated by the dashed line 712 (i.e., depicting effective index of refraction $n_{eff}$ at long wavelengths), the conventional filter fiber of FIG. 5A is configured to exhibit high loss at large wavelengths.

A conventional filter fiber, when subjected to bends as illustrated in FIG. 5B, becomes leaky, i.e., the filter fiber equivalent index profile 700' exhibits an "upward tilt" or bend-induced gradient with increasing radius, which is pronounced in the cladding region 710. At a critical bend radius 716 in the cladding region 710, as represented by the intersection of the dashed line 714 and the tilted profile 700', selectivity is reduced in that shorter wavelengths are no longer guided.

The tighter the bend, the closer the critical radius is to the center of the core region 702, such that selectivity is diminished for progressively lower wavelengths. This forces such designs to have smaller effective mode area than desired. Thus, ideal performance that a conventional filter fiber may achieve in principle is not achievable in a practical, coiled filter fiber.

Figure 6A:
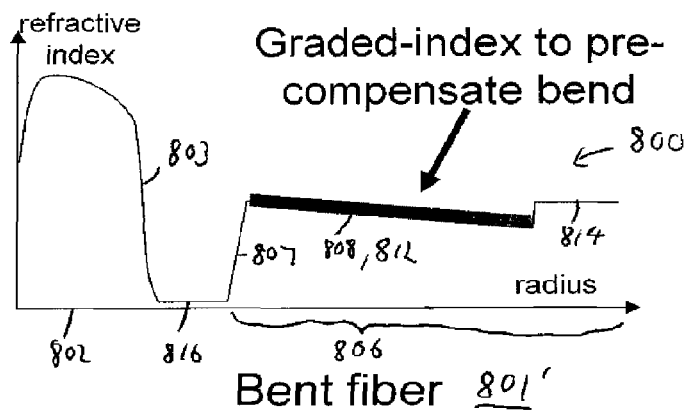
FIG. 6A is a refractive index profile of a pre-compensated filter fiber when the filter fiber is straight, according to an embodiment of the present invention.
Figure 6B:
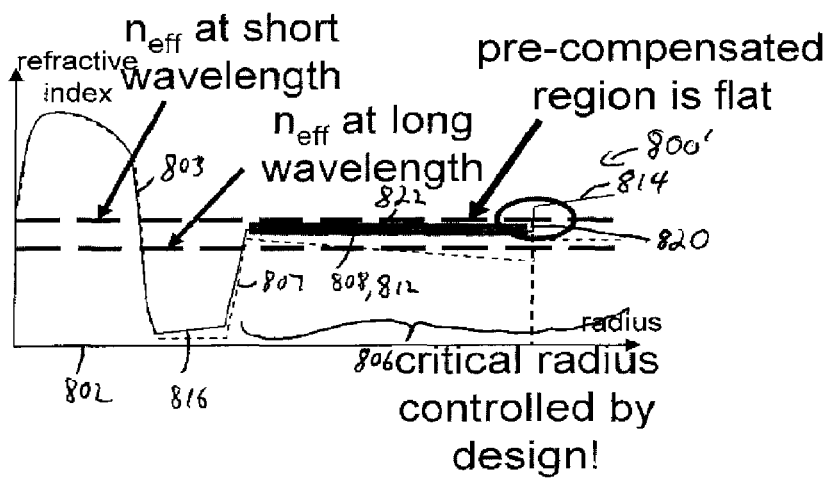
FIG. 6B is an equivalent refractive index profile of a pre-compensated filter fiber when the filter fiber is bent, according to an embodiment of the present invention.

FIG. 6A is a refractive index profile 800 of a pre-compensated filter fiber 801 when the filter fiber is straight, according to an embodiment of the present invention. FIG. 6B is a refractive index profile 800' of the pre-compensated filter fiber 801' when the filter fiber is bent, according to an embodiment of the present invention. The pre-compensated filter fiber 801, 801' includes a core region 802 near the fiber center, and a cladding region 806 formed about the core region 802. The cladding region 806 is configured to guide a mode supported by the core region 802. In operation, the cladding region 806 has an index of refraction designed to induce loss in guidance of the mode at particular wavelengths. In an embodiment, at least a portion 808 of the cladding region 806 has a graded-index index of refraction opposite the effective bend-induced gradient.

In one embodiment, the cladding region 806 may comprise an inner cladding region 812 and an outer cladding region 814. A trench region 816 may be formed between the core 802 and the inner cladding region 812. FIG. 6A depicts the inner cladding region 812 having a sub-region 808 with a tilt of index of refraction that pre-compensates an anticipated bend-induced gradient over the entire extent of the inner cladding region 812.

Figure 7A:
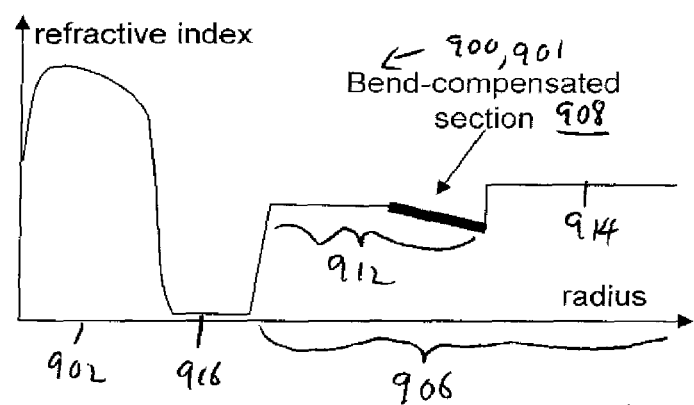
FIGS. 7A and 7B depict additional refractive index profiles of pre-compensated filter fibers when straight and bent, respectively, according to an embodiment of the present invention.
Figure 7B:
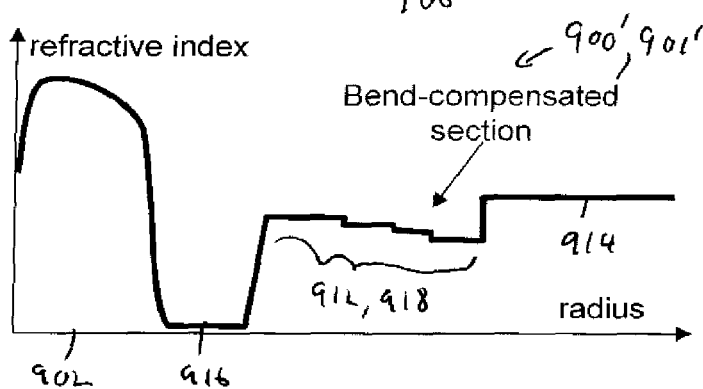

Bend loss is most sensitive to the index profile in a region where the equivalent index of the fiber is close to the effective index of the mode. Thus bend compensation can be effective even if only this portion of the fiber profile has a precompensating tilt as shown in FIGS. 7A and 7B. Referring to FIG. 7A, in one embodiment, a pre-compensated tilt in the index of refraction 900 of a filter fiber 901 may extend over only a portion 908 of the inner cladding region 912, preferably including a region at the outside of the inner cladding. FIG. 7A shows a pre-compensated tilt 902 that is substantially continuous. Referring to FIG. 7B, in an alternate embodiment, the filter fiber 901' may be fabricated with a small number of negative-going steps 918. In FIGS. 6A, 7A, 7B, the graded-index portion 808, 908 of the inner cladding region 812, 912 has a gradient opposite that of the bend-induced gradient.

Referring again to FIG. 6A, the refractive index profile 800 exhibits a high index of refraction in the core region 802 near the fiber center, with a rapidly decreasing index in the region 803 that settles in the substantially low index of refraction trench region 816, followed by rapidly increasing index in the region 807. In contrast to the filter fiber of FIG. 5A exhibiting a substantial plateau in a cladding region, the index of refraction of the inner cladding region 812 of FIG. 6A exhibits a negative-going tilt or grading to precompensate for an anticipated bend in the filter fiber 801.

With no perturbations, the pre-compensated filter fiber 801 of FIG. 6A is configured to rigorously guide a mode of a low wavelength of signal light with no loss and to exhibit high loss at large wavelengths. When subjected to bends as illustrated in FIG. 6B, the filter fiber 801 does not become leaky, i.e., the filter fiber equivalent index profile 800' exhibits a substantially flat equivalent index of refraction with increasing radius up to a critical radius 820 at an interface with the outer cladding region 814. Selectivity is thereby maintained in at least a portion of the inner cladding region 812. The critical radius 820 for short-wavelength leakage is now determined by the design.

In the embodiment depicted in FIG. 6A, the pre-compensated portion 808 of the filter fiber 801 has an index gradient $$dn/dr = -n_{substrate}/R_{eq},$$

where $n_{substrate}$ is the nominal index of the filter fiber 801 (e.g., with silica index=1.45), and $R_{eq}$ is the equivalent bend radius in the Marcuse model. As shown in FIG. 6B, when the filter fiber 801 is bent, optical properties are determined by the equivalent index, which has a substantially flat region 822 and is therefore more conducive to large effective mode area.

In one embodiment, $R_{eq}$ may simply be the physical radius of a coil of filter fiber. In another embodiment, the physical coil radius ($R_{coil}$) may be adjusted for strain and other effects to provide an equivalent radius (e.g., $R_{eq}=R_{coil}/0.8$). Further, the radius of curvature in a real fiber is never perfectly constant, and portions of the filter fiber 801 with smaller radius of curvature may contribute most of the loss, so $R_{eq}$ may depend on the detailed fiber handling and layout in a more complicated way, and may be determined empirically. In another embodiment, a filter fiber may be designed for an anticipated arrangement and utilized in a different arrangement. Pre-compensation may provide significant benefit within a range of arrangements (e.g., coil sizes), although a large mismatch between the anticipated and actual curvature may result in performance degradation (e.g. high bend loss, insufficient filtering, multi-modedness, etc).

In another embodiment, the material index of refraction of the filter fiber as a function of radial position r in the pre-compensated portion of the inner cladding region 812, 912 approximately equals the mode effective index $n_{eff}$ minus a compensation term, or:

$$n_{portion} \sim n_{eff}(1-r/R_{eq})$$

where Req is less than 50 cm and where the extent of the pre-compensated portion is large, illustratively greater than 20 microns.

The index of refraction of the core region 802, the radius of the core region 802, and index of refraction of the trench region 816 together substantially determine the effective area $A_{eff}$ and the effective refractive index $n_{eff}$ of a fundamental mode at a signal wavelength (where low loss is desirable) and at a noise wavelength (where large suppression is desirable). The equivalent index of the cladding region 806 (including a compensating tilt and bend perturbation) relative to the fundamental mode effective index determines the loss at the signal and noise wavelengths, respectively. In a preferred embodiment, the equivalent index of the cladding region 806 should fall below the signal-wavelength index $n_{eff}(\lambda_{signal})$ but also fall above the noise index $n_{eff}(\lambda_{noise})$ over the largest possible portion of the cladding region 806. As shown in FIG. 6B, this is best achieved when the bend perturbation is pre-compensated (and can be achieved to some extent even if the bend perturbation is imperfectly compensated). In some preferred embodiments, the pre-compensated filter fiber 801 includes a cladding region 806 with large radial extent that has a significant negative index gradient.

Figure 8:
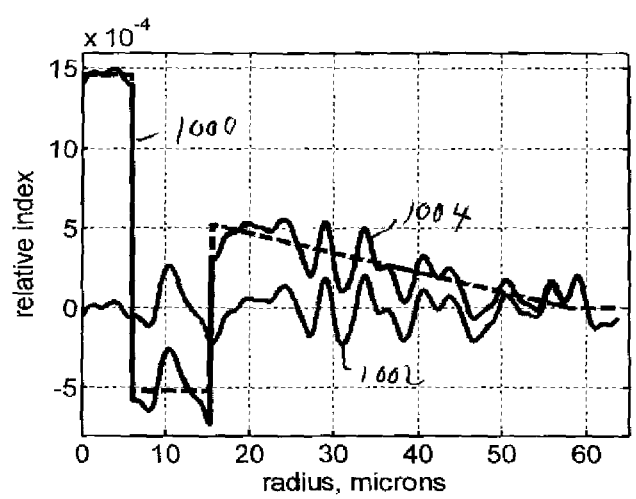
FIG. 8 shows an illustrative target index profile plotted along with irregularities in the index profile and a resulting summed total index profile.

An actual fabricated profile may have significant irregularities as would be appreciated by one of ordinary skill in the art having the benefit of this disclosure. FIG. 8 shows an illustrative target index profile 1000 plotted along with irregularities in the index profile 1002 and a resulting summed total index profile 1004. The gradient of the total index profile 1004 deviates significantly from the gradient of the target index profile 1000, yet calculated performance of the summed total index profile 1004 is very good. It will be appreciated by one of ordinary skill in the art having the benefit of this disclosure that the trend of the gradient or a smoothed gradient matches the target gradient over a large cladding region.

In an example, as shown in FIG. 8, the gradient of the target index profile may have a pre-compensated region with radial extent >40 microns.

Figure 9C:
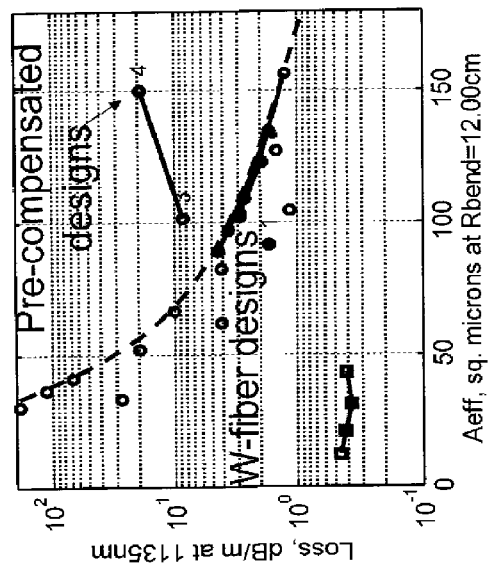
FIG. 9C is a plot of filtering loss versus effective area $A_{eff}$ of two proposed designs and several conventional bent filter fibers, each having a bend radius of about 12 cm.
Figure 9B:
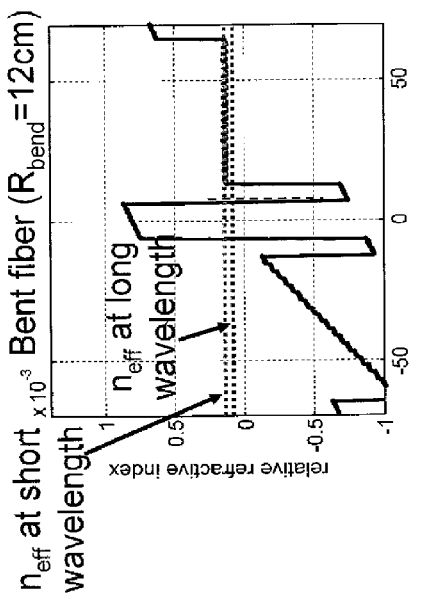
FIGS. 9A and 9B depict straight and bent profiles, respectively, of relative refractive index versus distance from the center of a filter fiber designed to be pre-compensated according to an embodiment of the present invention.
Figure 9A:
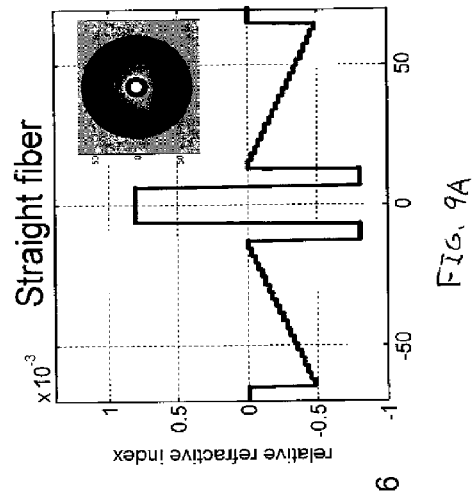

FIGS. 9A and 9B depict straight and bent profiles, respectively, of relative refractive index versus distance from the center of a filter fiber designed to be pre-compensated according to an embodiment of the present invention. In the example shown, $A_{eff}$ is selected to be about 150 μm² with a greater than 10× more selectivity than conventional W-fibers, as shown in FIG. 9C. The effective index difference is selected to be about $n_{eff}(1060 \text{ nm}) - n_{eff}(1135 \text{ nm}) \sim 0.6 \times 10^{-4}$. The fiber is selected to be radially symmetrical. The example of FIGS. 8A-8C illustrates that different signal loss thresholds may be employed, e.g., 0.1 dB/m. The threshold can ultimately be chosen to suit the anticipated fiber length and acceptable signal loss.

Similarly, the degree of suppression of the noise wavelength depends on the application and system parameters. Typically fiber length for gain fibers may be a few meters (e.g. for core-pumped Yb fibers with strong pump absorption) or may be many tens of meters (e.g. for cladding-pumped Er-doped fibers). For non-gain-doped fibers, length can vary over a much wider range, including lengths much shorter than 1 m. The total amount of noise loss (equal to the noise loss rate times the length) should be at least a few dB, but preferably greater than 20 dB. For example, the noise loss rate is thus preferably greater than 10 dB/m for short fiber lengths (e.g. 2 m), in order to achieve a product of 20 dB. For longer lengths (e.g. 20 m), 1 dB/m loss is sufficient to induce large total loss. For gain fibers, the suitable rate of signal loss and noise loss can be specified relative to the pump absorption (both specified in dB/m): noise loss should be at least 20% of pump absorption, and preferably at least 100% of pump absorption. Signal loss should be less than 5% of pump absorption, and preferably less than 1% of pump absorption.

The current invention is intended primarily for effective areas too large to achieve by more conventional means. Accordingly, it is primarily intended for effective areas greater than 50 sq. microns, and especially greater than 100 sq. microns.

Figure 10A:
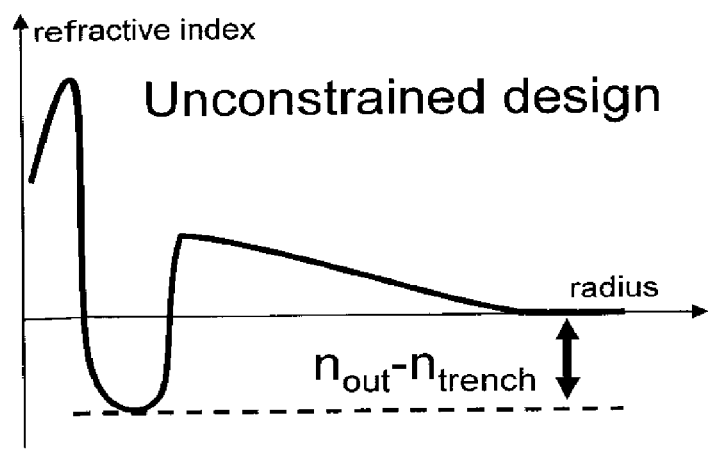
FIG. 10A illustrates one example of an unconstrained bend-compensated index profile, according to an embodiment of the present invention.
Figure 10B:
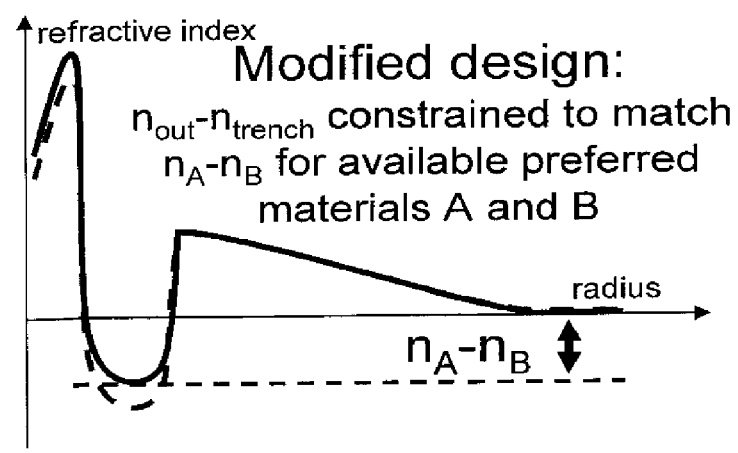
FIG. 10B shows a bend-compensated profile in which $n_{out} - n_{trench}$ is constrained to match $n_A - n_B$ for available preferred materials A and B, according to an embodiment of the present invention.

A very precisely defined index profile is desirable to achieve best performance. Preferred fabrication methods can improve index profile precision, make fabrication easier, or reduce cost. In an embodiment, bend-compensated filter fibers may be fabricated by conventional deposition (e.g. MCVD) or by "microstructured" fabrication methods (stacking). Such considerations and manufacturing methods may impose constraints on a design. FIG. 10A illustrates one example of an unconstrained bend-compensated index profile, while FIG. 10B shows a bend-compensated profile in which $n_{out} - n_{trench}$ is constrained to match $n_A - n_B$ for available preferred materials A and B. Other parameters (e.g., trench width) may be adjusted to satisfy the design requirements with this constraint.

In another example, the outer cladding may be formed in part from pure silica or a commercially available glass tube. Preferably, tubes with an index of pure silica or slightly above (0-5e⁻⁴) may be used, since these have low cost and highly predictable index. Other regions may be formed of pure silica or commercially available tubes. For example, the trench region may be pure silica.

The index difference between two regions may be constrained by available preferred materials. For example, two regions may be formed of identical materials, and have zero index difference, e.g., $n_{out} - n_{trench} \approx 0$. In another example, the well known fact that the refractive index of nominally pure and undoped silica can vary depending on fabrication conditions and method due to impurities and defects can be exploited by using one tube of Heraeus F300 glass to form part of the outer cladding, while the trench may be formed of undoped silica derived from another source, such as vapor phase deposition. This can result in an index difference, e.g., $n_{out} - n_{trench} \approx 5 \times 10^{-4}$.

Figure 11:
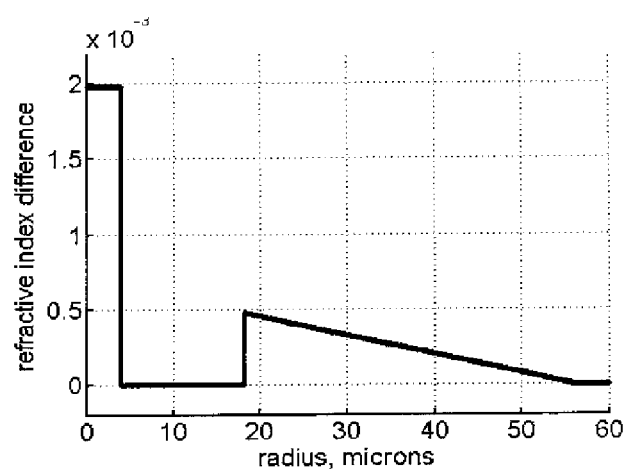
FIG. 11 shows a pre-compensated filter fiber designed with an index constraint, where the trench index equals the outer cladding index.

In another example, a pre-compensated filter fiber may be designed with an index constraint as shown in FIG. 11, where the trench index equals the outer cladding index.

In an example, as shown in FIG. 11, the gradient of the target index profile may have a pre-compensated region with radial extent >30 microns.

Figure 12A:
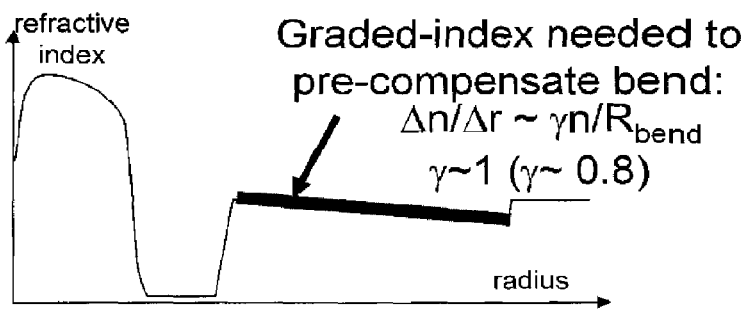
FIGS. 12A and 12B illustrate a rough technique for designing a bend-compensated profile having an assumed linear gradient in the inner cladding region of $\gamma n/R_{bend}$, according to an embodiment of the present invention.
Figure 12B:
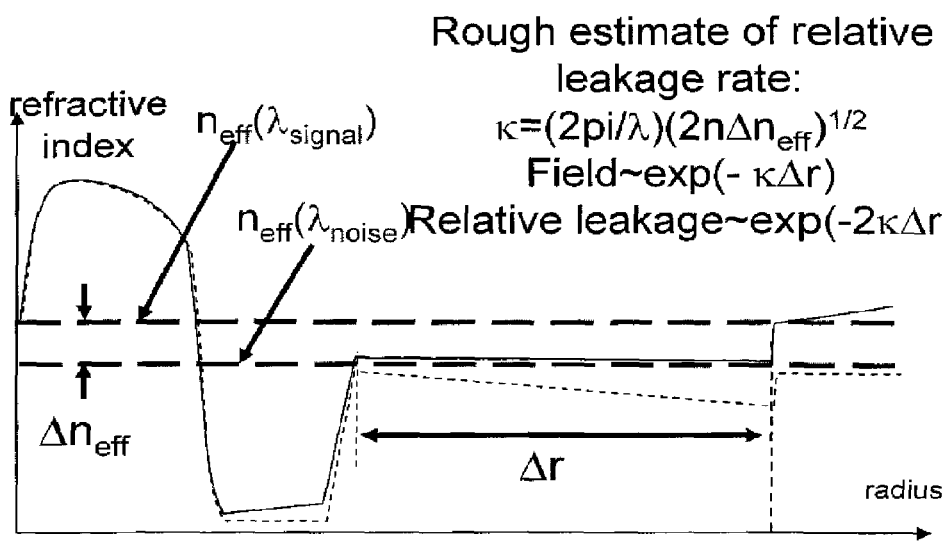

FIGS. 12A and 12B illustrate a rough technique for designing a bend-compensated profile having an assumed linear gradient in the inner cladding region of $\gamma n/R_{bend}$. The graded-index needed to pre-compensate a bend in the inner cladding region may be selected such that $\Delta n/\Delta r \sim \gamma n/R_{bend}$ and $\gamma \sim 1$ ($\gamma \sim 0.8$). In one example, $R_{bend} = 12$ cm, $\gamma \sim 0.8$, gradient $\sim 0.1/$cm $\sim 10^{-5}/\mu$m. A simple construction provides an estimate of how much relative leakage can be achieved between two wavelengths ($\lambda_{signal}$ and $\lambda_{noise}$). As shown in FIG. 11B, a rough estimate of relative leakage rate is:

$$\kappa = (2\pi/\lambda)(2n\Delta n_{eff})^{1/2}$$

Field~exp($-\Delta\kappa r$)
Relative leakage~exp($-2(2\pi/\lambda)(2n\Delta n_{eff})^{1/2}\Delta r$)
Relative leakage~exp($-2\kappa\Delta r$)

For example, if $\Delta r \sim 50$ microns and $\Delta n_{eff} \sim 0.6 \times 10^{-4}$, then the relative leakage is $\sim 4 \times 10^{-4}$.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An optical fiber, comprising:
a core region having a longitudinal axis; and
a cladding region surrounding the core region, the core region and cladding region configured to support and guide the propagation of signal light in a fundamental transverse mode in the core region in the directions of the axis, the fiber having a bend-induced gradient in its equivalent index of refraction, at least a portion of cladding region having a graded index of refraction opposite the bend-induced gradient of the mode;
wherein the cladding region comprises an inner cladding region and an outer cladding region and the optical fiber further comprises a trench region formed between the core region and the inner cladding region;
the index of refraction of the fiber as a function of radial position in a pre-compensated portion of the inner cladding region equals the mode effective index minus a compensation term.

2. The optical fiber of claim 1, wherein the cladding region is configured to have a substantially flat equivalent index in response to a bend of the optical fiber.

3. The optical fiber of claim 1, wherein the slope of the graded index of refraction is substantially negative.

4. The optical fiber of claim 3, wherein the slope of the graded index of refraction is constant.

5. The optical fiber of claim 3, wherein the slope of the graded index of refraction comprises a predetermined number of steps.

6. The optical fiber of claim 1, wherein the portion of cladding region having a graded index of refraction opposite the bend-induced gradient extends over at least a portion of the inner cladding region.

7. The optical fiber of claim 1, wherein the portion of cladding having a graded index of refraction opposite the bend-induced gradient extends to a boundary dividing the inner cladding region and the outer cladding region.

8. The optical fiber of claim 7, wherein the critical radius is selected by design.

9. The optical fiber of claim 1, wherein the optical fiber is configured to guide the mode with substantially no loss at low wavelengths and to exhibit high loss at large wavelengths.

10. The optical fiber of claim 1, wherein the outer cladding region and the trench region having the same index of refraction.

11. The optical fiber of claim 1, wherein the outer cladding region is formed of at least one glass tube or of pure silica.

12. The optical fiber of claim 11, wherein at least a portion of the outer cladding region is formed of one tube of Heraeus F300 glass.

13. The optical fiber of claim 1, wherein the trench region is formed of pure silica or at least one glass tube.

14. The optical fiber of claim 1, wherein the core region includes at least one dopant that increases its index above that of the cladding region.

15. The optical fiber of claim 14, wherein the at least one dopant is at least one of Ge, Al and P.

16. The optical fiber of claim 1, wherein the core region includes at least one dopant that decreases its index above that of the cladding region.

17. The optical fiber of claim 16, wherein the one at least one dopant is F.

18. The optical fiber of claim 1, wherein the core region includes at least one dopant that renders the optical fiber gain-producing.

19. The optical fiber of claim 18, wherein at least a portion of the core region is doped with a rare earth element or Cr.

20. The optical fiber of claim 1, wherein a cross-section of the core region is one of circular, annular, elliptical, polygonal, or other more complex shapes.

* * * * *